US008325881B2

(12) United States Patent
Triano et al.

(10) Patent No.: US 8,325,881 B2
(45) Date of Patent: Dec. 4, 2012

(54) FACILITY OUTAGE RESTORATION SIMULATOR INQUIRY TOOL

(75) Inventors: Stephen Francis Triano, Kearney, NJ (US); James Gordon Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 556 days.

(21) Appl. No.: 12/547,909

(22) Filed: Aug. 26, 2009

(65) Prior Publication Data

US 2011/0051904 A1 Mar. 3, 2011

(51) Int. Cl.
*H04M 1/24* (2006.01)
*H04M 3/08* (2006.01)
*H04M 3/22* (2006.01)
*H04M 7/00* (2006.01)

(52) U.S. Cl. ............ 379/32.01; 379/29.02; 379/221.04

(58) Field of Classification Search ............... 379/29.02, 379/32.01, 221.03, 221.04; 714/4.11, 4.2, 714/47.1
See application file for complete search history.

(56) References Cited

U.S. PATENT DOCUMENTS

| 8,018,835 B1* | 9/2011 | Croak et al. ............ 370/216 |
| 2009/0083586 A1* | 3/2009 | Warner et al. ............ 714/47 |

* cited by examiner

*Primary Examiner* — Quoc D Tran
(74) *Attorney, Agent, or Firm* — Hope Baldauff Hartman, LLC

(57) ABSTRACT

Methods, systems, and computer-readable media for preparing for a service disruption are provided. Information relating to an activity at a target location is received. Upon receiving information relating to at least the activity at the target location, stored data related to the activity and the target location are gathered. A probability of a service disruption at the target location based on at least the stored data related to the activity and the target location is assessed and the target location is monitored. Upon detecting a change in services associated to the target location, an alert is generated.

17 Claims, 6 Drawing Sheets

FACILITY OUTAGE RESTORATION SIMULATOR INQUIRY TOOL

TECHNICAL FIELD

Exemplary embodiments are related to provisioning for service disruptions. More particularly, exemplary embodiments relate to proactively preparing for a service disruption utilizing a facility outage restoration simulator inquiry tool.

BACKGROUND

Presently, before a customer, such as a professional contractor or homeowner is allowed to dig in the ground, the customer is required to make a phone call to 811. This initiates a process to get the underground utility lines at the digging site marked. When a call to 811 is made, the call is routed to a local one call center. The local one call center operator gathers information on the location of the digging job and routes the call to all the affected utility companies. The utility companies then send a professional locator to the digging site to perform a locate by marking the utility lines within a few days. Once the approximate location of the underground lines has been marked, the professional contractor or homeowner may proceed with digging at the dig site.

However, these dig sites become very high risk areas for cable cuts or other hardware disruptions even when the locates are performed accurately. In the event that a cable does get cut, the service restoration department of the utility companies must react to isolate the outage location, assess the services impacted and then restore service as soon as possible. Depending on the extent of damage, it can take a very long time to restore service. It may be desirable for utility companies to be able to restore some services, such as emergency call lines, 911 lines and other preferred subscription services lines quickly. Additionally, utility companies may need to restore service by rerouting the flow of data traffic carried by the affected cables. At the current time, the contingency planning for service disruptions caused by an activity at a dig site is reactive and not proactive, leading to longer service restoration times and a more panicked response.

SUMMARY OF THE INVENTION

In accordance with exemplary embodiments, the above and other problems are solved by providing methods, systems, and computer-readable media for proactively preparing for service disruptions. According to one aspect of the present invention, a method is provided for preparing for a service disruption. The method involves receiving information relating to an activity at a target location. Upon receiving the information relating to at least the activity at the target location, stored data related to the activity and the target location is gathered. A probability of a service disruption at the target location based at least on the stored data related to the activity and the target location is assessed and the target location is monitored. Upon detecting a change in services associated with the target location, an alert is generated.

According to another aspect, a computer-readable medium is provided having computer-executable instructions stored thereon which, when executed by a computer, cause the computer to receive information relating to an activity at a target location. Upon receiving information relating to at least the activity at the target location, stored data related to the activity and the target location is gathered. A probability of a service disruption at the target location based on at least the stored data related to the activity and the target location is assessed and the target location is monitored. Upon detecting a change in services associated to the target location, an alert is generated.

According to yet another aspect, a system for preparing against service disruptions includes a memory device for storing a program for preparing against service disruptions and a processor, functionally coupled to the memory device, where the processor is responsive to computer-executable instructions contained in the program. The processor is configured to receive information relating to an activity at a target location. Upon receiving information relating to at least the activity at the target location, stored data related to the activity and the target location is gathered. A probability of a service disruption at the target location based on at least the stored data related to the activity and the target location is assessed and the target location is monitored. Upon detecting a change in services associated to the target location, an alert is generated.

The above-described aspects may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
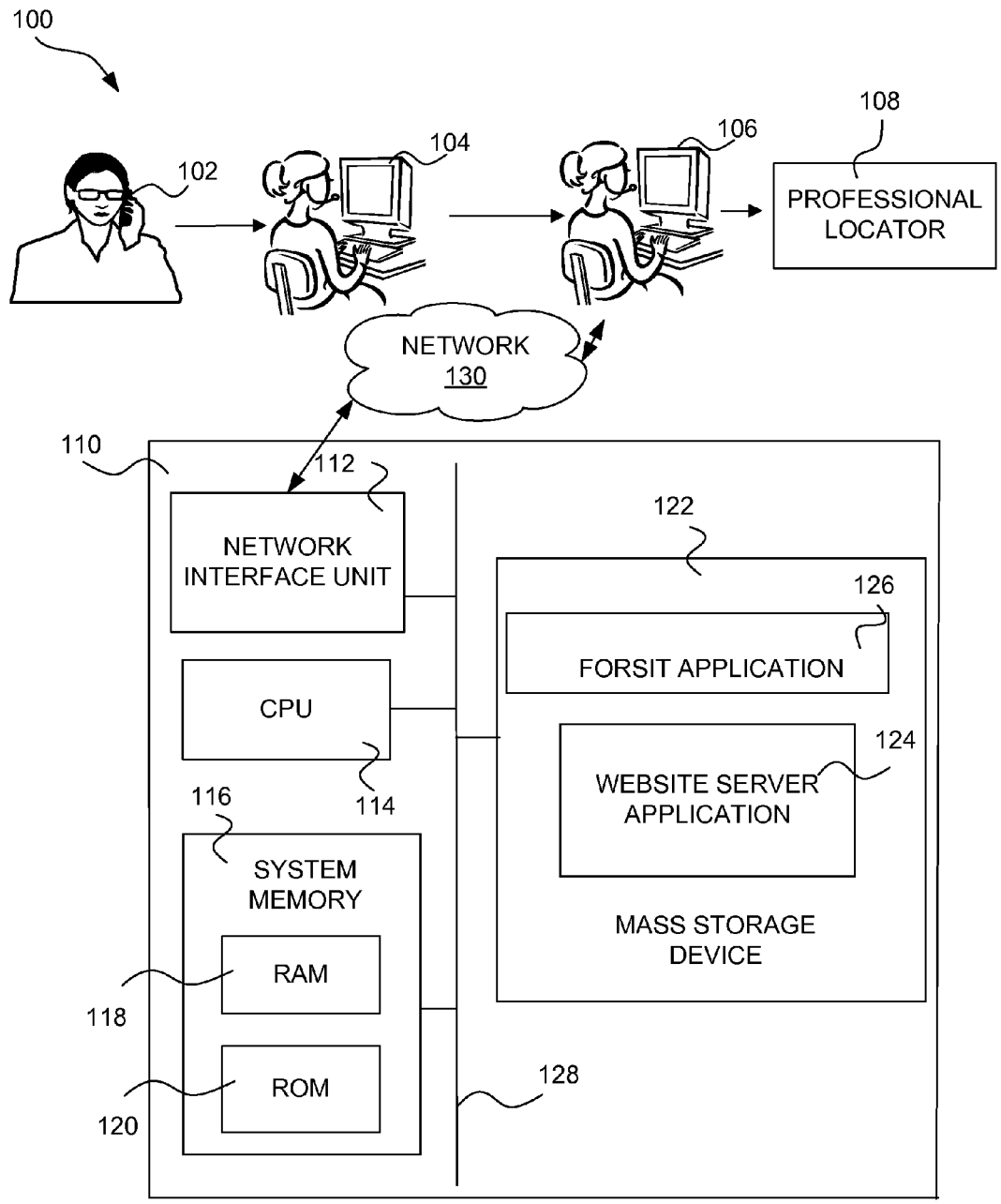
FIG. 1 illustrates an operating environment utilized in various embodiments.

Exemplary embodiments provide methods, systems, apparatus, and computer-readable media for proactively preparing for a service disruption caused by an activity at a target location, such as a dig site. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the exemplary embodiments may be implemented. While exemplary embodiments will be described in the general context of program modules that execute in conjunction with an application program that runs on an operating system on a computer system, those skilled in the art will recognize that exemplary embodiments may also be implemented in combination with other program modules.

Generally, program modules include routines, programs, components, data structures, and other types of structures that perform particular tasks or implement particular abstract data types. Moreover, those skilled in the art will appreciate that exemplary embodiments may be practiced with other computer system configurations, including hand-held devices, multiprocessor systems, microprocessor-based or programmable consumer electronics, minicomputers, mainframe computers, and the like. Exemplary embodiments may also be practiced in distributed computing environments where tasks are performed by remote processing devices that are linked through a communications network. In a distributed computing environment, program modules may be located in both local and remote memory storage devices.

Turning now to FIG. 1, an illustrative operating environment 100 for practicing the various embodiments will now be described. In particular, when a customer 102, such as a professional contractor or homeowner wants to dig in the ground, the customer 102 may be required to call a local one call center to request a locate prior to digging. A local one call center operator 104 gathers information on the location of the digging site, including which hardware, such as cables, towers, and pipes, is located at the digging site as well as information pertaining to the customer 102. Once the operator 104 gathers this information, the operator 104 may route the gathered information to all of the affected utility companies, such as AT&T. A utility company operator 106 then sends a professional locator 108 to the digging site to mark the utility lines within a few days. According to various embodiments, the utility company operator 106 also supplies the gathered information to a server computer 110 operating a facility outage restoration simulator inquiry tool ("FORSIT") application 126 over a network 130. The FORSIT application 126 may be configured to assist in proactively preparing for a service disruption caused by an activity at the dig site. Details regarding the FORSIT application 126 will be described below with regard to FIG. 3.

Still referring to FIG. 1, the server computer 110 may include a standard server computer capable of providing services to other computing systems, such as the workstation associated with the utility company operator 106, over the network 130. The server computer 110 is operative to store and execute a web server application 124, such as the INTERNET INFORMATION SERVER from MICROSOFT CORPORATION. It should be appreciated by those skilled in the art that other web server applications may also be utilized. In an embodiment of the present invention, the web server application 124 may be stored in a mass storage device 122 of the server computer 110. According to exemplary embodiments, the web server application 124 is operative to execute the FORSIT application 126, which may also be stored in the mass storage device 122, and receive and respond to requests from computers connected to the server computer 110 via a network, such as the network 130, for information and services provided by the FORSIT application 126 described herein.

The server computer 110 may also include a CPU 114, a system memory 116, including a RAM 118 and a ROM 120, and a system bus 128 that couples the system memory 116 and the mass storage device 122 to the CPU 114. The CPU 114 of the server computer 110 may be a standard central processor that performs arithmetic and logical operations, a more specific purpose programmable logic controller ("PLC"), a programmable gate array, or other type of processor known to those skilled in the art and suitable for controlling the operation of the server computer. CPUs are well-known in the art, and therefore not described in further detail herein. The mass storage device 122 is connected to the CPU 114 through a mass storage controller (not shown) connected to the bus 128. The mass storage device 122 and its associated computer-readable media provide non-volatile storage for the sever computer 110. Although the description of computer-readable media contained herein refers to a mass storage device, such as a hard disk or CD-ROM drive, it should be appreciated by those skilled in the art that computer-readable media can be any available media that can be accessed by the server computer 110.

By way of example, and not limitation, computer-readable media may comprise computer storage media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the server computer 110.

According to various embodiments, the server computer 110 operates in a networked environment. The server computer 110 may connect to the network 130 through a network interface unit 112 connected to the bus 128. It should be appreciated that the network interface unit 112 may also be utilized to connect to other types of networks and remote computer systems. Details of other network connections will be described with respect to FIG. 2.

According to an embodiment, the utility company operator 106 may be operating a workstation communication device. The workstation communication device that communicates with the server computer 110 may be associated with the network 130 such that communications provided by the workstation communication device of the utility company operator 106 is sent via the network 130 to the server computer 110, and vice versa. The network 130 may include a wireless network such as, but not limited to, a WLAN such as a WI-FI network, a WWAN, a WPAN such as BLUETOOTH, a WMAN such a WiMAX network, or a cellular network. Alternatively, the network 130 may be a wired network such as, but not limited to, a WAN such as the Internet, a LAN such as the Ethernet, a (PAN), or a MAN.

Embodiments describe technologies for proactively preparing for service disruptions within a communication network caused by hardware failures due to an activity at a target location. The communication network may span an entire geographic area, such as a neighborhood, city, state or country. Furthermore, a service disruption within the communication network may disrupt the entire communication network or a part of it.

The scope of the exemplary embodiments is not limited to these embodiments, and may include technologies for proactively preparing for rerouting data traffic even without actually experiencing a service disruption. In some embodiments, changes may be made to the data traffic based on certain parameters exceeding threshold values, such as when the volume of data traffic passing through a target location exceeds a particular threshold value. It should further be appreciated that the scope of the exemplary embodiments also includes preparing for a service disruption in non-physical transmission layers, such as the various transmission layers present in wireless communications, as will be described in further detail below.

Figure 2:
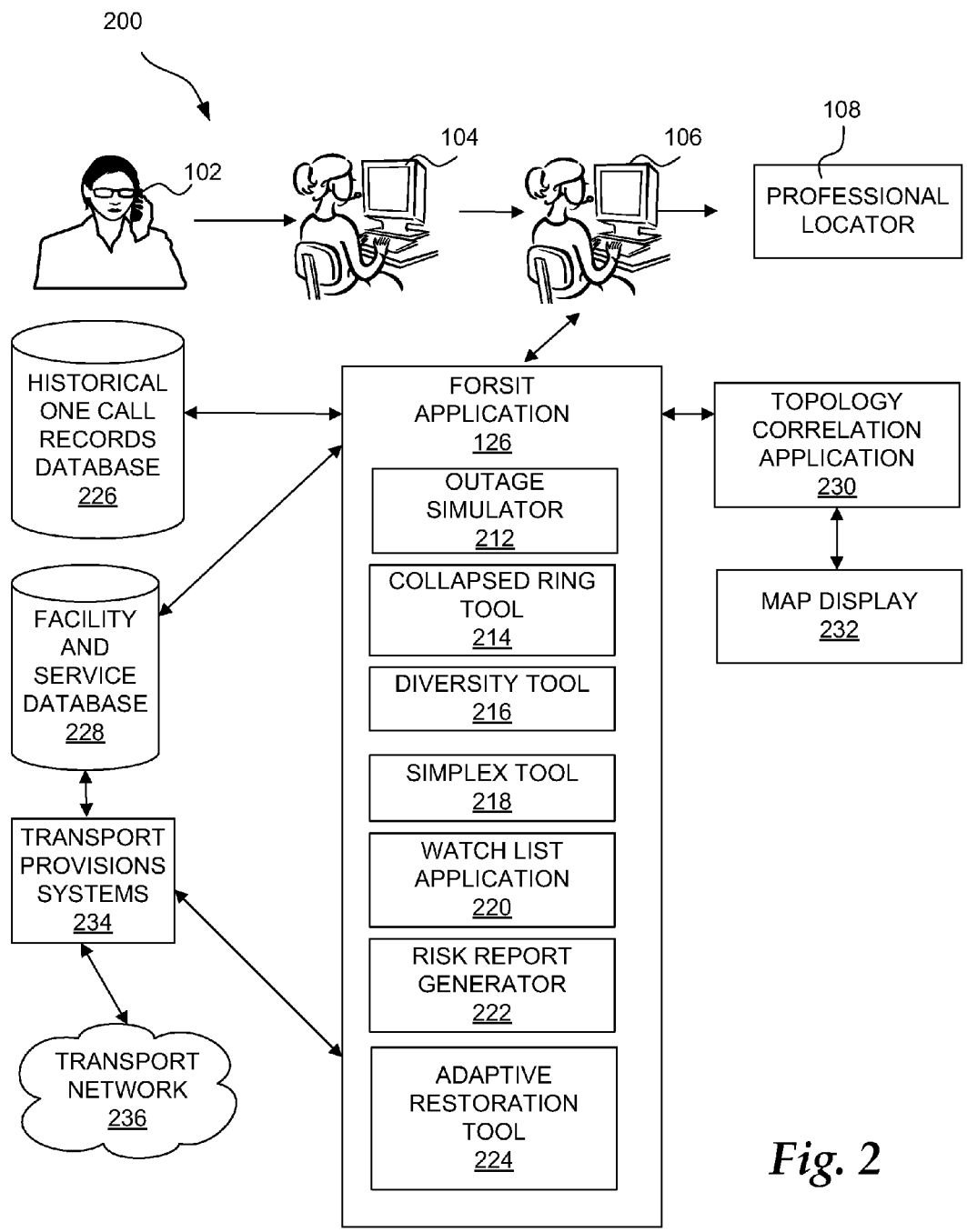
FIG. 2 illustrates a detailed operative environment of a facility outage restoration simulator inquiry tool application utilized in various embodiments.

Turning now to FIG. 2, an operation environment 200 for proactively preparing for a service disruption is shown. As will be described in detail below, the FORSIT application 126 may be utilized to assist in proactively preparing for a service disruption caused by a hardware failure during an activity at a target location. The FORSIT application 126 includes a plurality of modules configured to perform specific functions. As described above, when a customer requests a locate at a target location, the utility company sends out a professional locator to demarcate hardware, such as cables at the target location. Even though the locator marks the cables, there is still a risk that a customer performing an activity at the target location may disrupt service at the target location by for example, cutting the cables, breaking a connection between two cables, or damaging any hardware located at the target location. By utilizing the FORSIT application 126, utility companies may become better prepared to handle service disruptions that are caused by an activity being performed at the target location.

The FORSIT application 126 may include an outage simulator module 212, a collapsed ring tool module 214, a diversity tool module 216, a simplex tool module 218, a watch list application module 220, a risk report generator module 222 and an adaptive restoration tool module 224. It should be appreciated that the FORSIT application 126 may include other modules configured to perform other functions, or may include some but not all of the modules that are listed above. Further, the FORSIT application 126 may not include these modules but may call upon them remotely or through the execution of other programs or modules.

In addition, the FORSIT application 126 may utilize a plurality of database records that are either stored on the server computer 110 or at a remote location. For instance, various embodiments of the FORSIT application 126 may communicate with a historical one call records database 226 that has stored data pertaining to previous one call records, customer information and facilities. The historical one call records database 226 includes data records of one call records that have been requested. The database may include entries for each one call request that has been placed, including information related to the customer or contractor requesting an activity, the type of activity, the duration of the activity and whether the facility experienced a service disruption. Other databases that the FORSIT application 126 may communicate with include a facility and service database 228 that stores data pertaining to the facilities, the types of data passing through the target location and other facilities that are capable of being affected by a service disruption at the target location. These databases may be continuously updated as changes to the communication network is made and more one call record requests are made.

Figure 3:
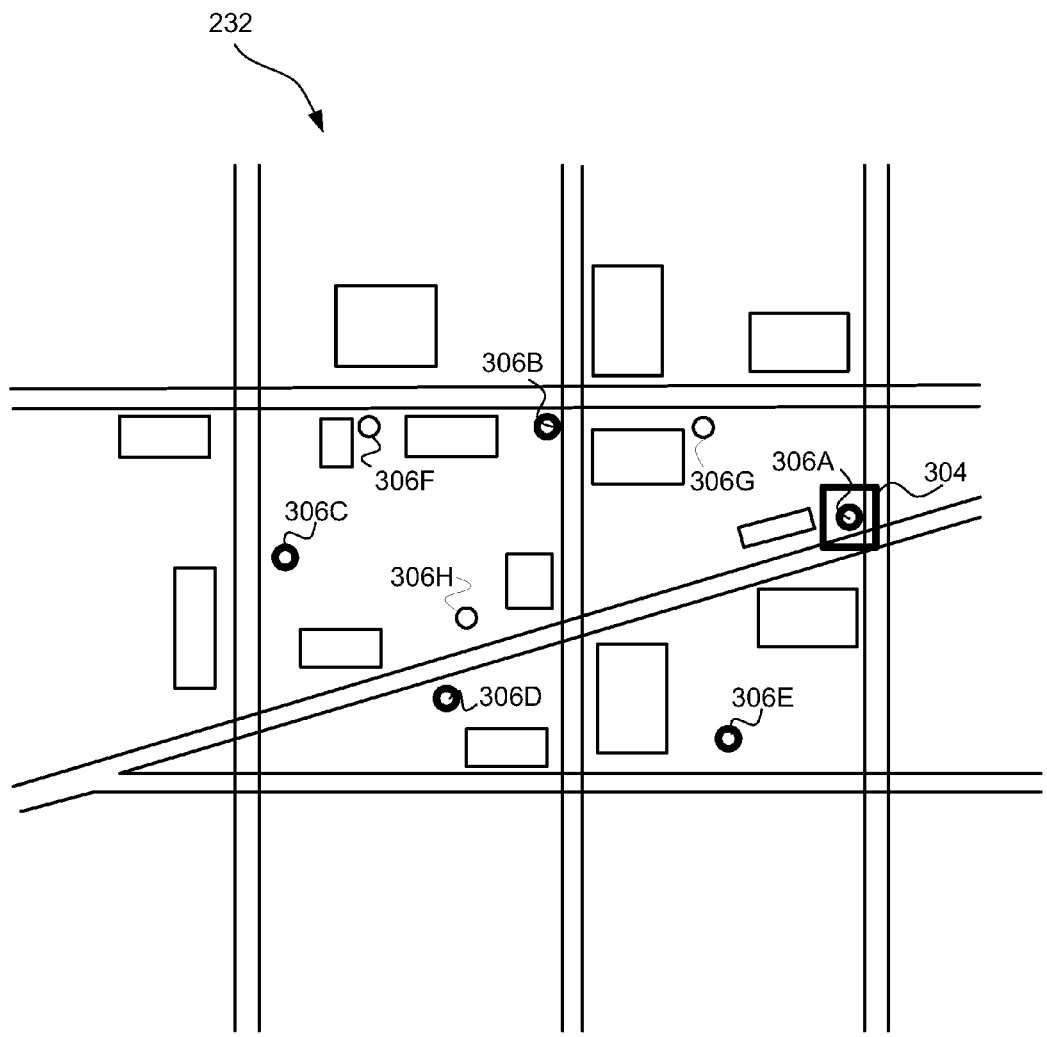
FIG. 3 illustrates a street map indicating target locations according to various embodiments.

The FORSIT application 126 may also communicate with other applications, such as a topology correlation application 230. In particular, the topology correlation application 230 may be configured to generate a map display 232, such as the map display (shown in FIG. 3) that is responsive to the FORSIT application 126. Referring briefly to FIG. 3, the map display 232 illustrates a map of a general area where customers have placed locate requests with the one call center for conducting an activity at a facility. The activity may include activities, such as a dig request for installing new lines or rerouting wires for the installation of a fence. Facilities 306A-306H include target locations 306A-306E, which are those facilities where a customer has placed a request for conducting an activity. The remaining facilities 306F-306H represent facilities where no customer has requested a locate with the one call center. However, it should be appreciated that when an activity is performed at a particular target location, for example 306A, there is a risk of a service disruption at all the other facilities 306B-306H. This is because hardware at the other facilities 306B-306H communicating with the disrupted target location 306A may no longer send or receive data to and from the hardware at the disrupted target location 306. Further, if disruption of service is detected at one of the facilities 306A-306H, such as the target location 306A, the topology correlation application 230 and/or the FORSIT application 126 may provide an alert 304 shown around the target location 306A illustrating that a service disruption has occurred at that particular target location. The map display 232 may be presented to the utility company operator 106 via the workstation communication device, or to a service restoration crew via a portable display device, or other personnel who may be authorized to receive such information.

In addition, the FORSIT application 126 may also be in communication with a transport provisions system 234, which may have access to a transport network 236 that provides an updated status of the communication network. The transport provisions system 234 and the transport network 236 may assist the FORSIT application 126 in preparing an adaptive restoration plan based on an analysis of the current status of the communication network and the status of pending activities at target locations. Details relating to the transport provisions system and the transport network will be provided below.

According to embodiments, the utility company operator 106 may supply the FORSIT application 126 with information, including information regarding the customer, the activity to be performed by the customer, and the target location. Upon receiving this information, the FORSIT application 126 proceeds to execute several modules, which are described in detail below, which may prepare an adaptive restoration plan.

The collapsed ring module 214 may be executed by the FORSIT application 126 to determine the location of any collapsed rings within a communications network. In a communication network, a collapsed ring is where a primary ring serves as the primary path that all the data traffic flows on and a standby ring is on standby to provide automatic protection if the primary ring fails. In a collapsed ring topology, it is typical for the primary ring and the standby ring to be physically located next to each other. In some embodiments, the primary ring and the standby ring may be located in the same cable, conduit or trench. If a digging error does occur on a segment of the collapsed ring, there is a high probability that both the primary path and the protected path would be cut causing a service outage. Therefore, it may be useful to determine whether any collapsed rings exist at the dig site. According to embodiments, when executing the FORSIT application 126, the collapsed ring module 214 may be employed to determine whether there is a collapsed ring at the target location, whether a collapsed ring may be affected by damage caused to hardware associated with the target location, or whether a collapsed ring may be formed upon a cut made to any hardware associated with the target location.

Similar to the collapsed ring module 214, the simplex module 218 may be configured to determine the location of a simplex condition within a communication network. A simplex condition is when a data path normally would have redundancy for protection but all but one of the paths is down. For example, in a proper ring configuration if either the primary ring or the standby ring is down, the data path would be operating in a simplex condition. A simplex condition may be undesirable because the working data path operates without any protection. If a digging error was to occur on the working path, there would be no standby rings to switch to, thereby causing a service outage. Therefore, it may be useful to determine whether a simplex condition exists at the dig site. In particular, when executing the FORSIT application 126, the simplex module 218 may be employed to determine whether there is a simplex condition at the target location, or whether a simplex condition may arise due to damage to hardware associated with the target location.

The diversity module 216 may be configured to determine whether there is diversity throughout the communication network. Diversity in a communication network exists where data traffic may be carried through alternate routes. Typically, the availability of diversity throughout a communication network may allow the data traffic to be rerouted through facilities that are not affected by a service disruption. In particular, when executing the FORSIT application 126, the diversity module 216 may be employed to determine whether there is diversity available at the target location, such that if there is damage to hardware associated with the target location and the target location is no longer able to carry data traffic, alternate routes for data traffic may be established so as to reduce the adverse impact of a service disruption.

The FORSIT application 126 may also include the watch list application 220, which may be configured to generate a watch list for an operator, such as the utility company operator 106. The watch list may include a list of all target locations and other facilities that may be at a high risk of experiencing a service disruption. In particular, when executing the FORSIT application 126, the watch list application 220 may be utilized to generate a list of the target locations 306A-306E and monitor the flow of data traffic at those locations. In one embodiment, the watch list application 220 may also include a list of the other facilities 306F-306H that are capable of being affected as a result of a service disruption at the target location 306A. This may allow the FORSIT application 126 to monitor facilities that are likely to experience a change in data traffic, but are not target locations. As described above, there may be a change in the volume of data traffic at facilities close to the target location as the FORSIT application 126 may reroute traffic away from the target location 306A towards the facilities 306B-306H other than the target location.

According to embodiments, the watch list may be provided to an operator, such as the utility company operator 106, via the operator's workstation or the FORSIT application 126 may provide the watch list to the topology correlation application 230, which may then use the watch list to help in generating or supplementing the map display 232. According to exemplary embodiments, the watch list allows the operator 106 to focus his/her attention on those locations at high risk for experiencing a service disruption and notify the service restoration crew of a service disruption at one of the disrupted target locations 306A promptly. According to embodiments, the watch list may include all of the dig locations that may be at risk of being affected or just a subset of locations that are deemed riskier. Locations that are not considered critical may not need to have their status updated and therefore, may not be included in the watch list. In some embodiments, refreshing the status of the riskier locations is needed because the nature of the network is dynamic and is constantly changing. For example, a data path near a dig location may initially be at low risk because a standby path is fully operational. Later on, the data path may go into a simplex mode due to an event on the standby path, such as hardware failure or maintenance event, causing a much higher risk of service disruption at the dig location. Accordingly, the risk level is updated on the watch list by the watch list application 220. In various embodiments, crew members responsible for restoring services may be provided with the watch list and/or map display 232, to notify them of any service disruptions at the target locations 306A-306E. In addition, the watch list may be utilized in generating a risk evaluation report 400 (shown in FIG. 4), details of which will be described below.

The FORSIT application 126 also includes the risk report generator module 222, which may be configured to generate the risk evaluation report 400 that indicates the level of risk at the target locations 306A-306E and other facilities 306F-306H that may be affected by a service disruption at the disrupted target location 306A. The risk evaluation report 400 may also include a priority rating 414 (shown in FIG. 4) for each target location 306A-306E indicating which target locations may receive priority in restoring services upon experiencing a service disruption. The risk evaluation report 400 may be provided to an operator, the service restoration crew or may be utilized by the adaptive restoration tool module 224 of the FORSIT application 126 for preparing an adaptive restoration plan that may be implemented in the event of a service disruption.

The risk rating 412 (shown in FIG. 4) for each target location 306A-306E may be based on factors such as the type of activity, the duration of the activity, the contractor performing the activity, the type of data being transmitted through the hardware associated with the target location, the volume of data traffic, amongst other data. It should be appreciated that the risk of a hardware disruption varies with the type of activity occurring at a target location. For instance, a high number of hardware disruptions occur during road widening projects. Therefore, the FORSIT application 126 may assign locations associated with the road widening projects a higher risk rating. Further, information relating to the contractor, such as the contractor's historical performance related to a particular target location and type of activity may be retrieved from the historical one call records database 226, and utilized in determining the risk rating 412 for the target location. Information relating to the target location, such as the number of times a service disruption has occurred at the particular target location, the type of activity that caused the service disruption, the amount of time taken to restore the service and other historical data relating to the facility may be retrieved from the facility and service database 228. Additionally, the risk rating 412 may also depend on the presence of a collapsed ring, the presence of a simplex condition or the amount of diversity available at the target location. Information pertaining to these factors may be retrieved from the collapsed ring tool 214, the simplex tool 218 and the diversity tool 216, respectively.

The adaptive restoration tool module 224 utilizes a wide variety of information to develop an adaptive restoration plan that may be implemented in the event of a service disruption. The adaptive restoration plan is a restoration plan that may be implemented automatically through the FORSIT application 126, through another computer application or through an operator. In developing the adaptive restoration plan, the adaptive restoration tool module 224 may utilize information regarding the target location 306A, the type of data being transmitted through the hardware associated with the target location 306A, the volume of data traffic flowing through the target location 306A as well as data traffic flowing through other facilities 306B-306H near the target location 306A from the transport provisions system 234. In addition, the adaptive restoration tool module 224 may receive information from the collapsed ring tool module 214 and the simplex tool module 218 to generate plans that avoid forming collapsed rings and simplex conditions. Additionally, the adaptive restoration tool module 224 may utilize the diversity tool module 216 to establish, improve and/or maintain diversity available throughout the communication network in the adaptive restoration plan. Moreover, the adaptive restoration tool module 224 may obtain other details regarding the target locations 306A-306E and other facilities 306F-306H capable of being affected by the target locations 306A-306E, such as the type of hardware associated with the facilities and the type of data being transmitted through the hardware from the facilities and services database. This information may be obtained by the adaptive restoration tool module 224 by communicating with the transport provisions system 234 that gathers information regarding the status of the communication network, such as the volume of data traffic at all facilities, as described above.

In various embodiments, the adaptive restoration tool module 224 may preemptively reroute data traffic away from the target location 306A prior to any activity occurring at the target location 306A in order to prevent any service disruptions. It should be appreciated that the option of preemptively rerouting data traffic may be utilized where data traffic flowing through the target location may likely be restored after a long period of time in the event of a service disruption, or if the type of data flowing through the target location includes high priority data, such as IPTV data, emergency calls, E911 calls and government or military communications.

In addition, the adaptive restoration tool module 224 may prepare multiple adaptive restoration plans taking into account the variability in the extent of damage at the target location. For instance, if only one cable is cut at the target location, wherein the cut cable was only carrying telephone signals, the adaptive restoration tool module 224 may prepare a restoration plan that only reroutes the telephone calls through alternate routes. However, if all the cables at the target location are cut, the adaptive restoration tool module 224 may have another restoration plan that reroutes all communication traffic passing through the target location to other facilities. Further, it should be appreciated that because multiple customers may place dig requests at any one time, the adaptive restoration tool module 224 may be configured to account for possible cuts at other target locations 306B-306E, and therefore prepare other alternate restoration plans in the event of possible cuts at other target locations 306B-306E requested by other customers.

According to embodiments, the adaptive restoration tool module 224 may prepare a separate adaptive restoration plan for each layer of transmission data passing through the hardware associated with the target location. For instance, voice communication, E911 calls, facsimile communication and internet services may be rerouted using separate adaptive restoration plans.

According to embodiments, the adaptive restoration tool module 224 may also be configured to prepare an adaptive restoration plan that ensures that the communication network is diversified, data traffic rerouted to other facilities 306B-306H do not exceed the maximum capabilities of the particular facility, and alternate routes are kept available in the event another dig request at another target location 306B-306E is requested before the service of the disrupted target location 306A is restored. Additionally, some services may not restore after a service disruption at the target location 306A. In such situations, the FORSIT application 126 may create an automated adaptive restoration plan for services that do not auto restore.

In addition to the modules described above, the FORSIT application 126 includes the outage simulator module 212, which may be utilized to simulate the flow of data traffic over the communication network if a service disruption were to occur at a target location. According to embodiments, the outage simulator module 212 may be configured to simulate the adaptive restoration plan prior to any service disruptions in the communication network. The outage simulator module 212 may further be configured to be used in preparing the adaptive restoration plan using information provided by the facility and service database 228. According to embodiments, the outage simulator module 212 may simulate the flow of data traffic through the communication network when the hardware associated with the target location 306A is completely damaged or partially damaged. In a situation where the hardware is partially damaged, data transmitted on the undamaged layers of the hardware may still be transmitted via the target location, while data being transmitted on the damaged layers of the hardware may not be transmitted. The outage simulator module 212 may produce a simulation describing the impact of the disruption to subscribers of the utility service.

In various embodiments, the outage simulator 212 module may also simulate the flow of data traffic if some of the data traffic is rerouted away from the target location 306A. In addition, the outage simulator module 212 may describe the flow of data traffic from one facility to another facility. Therefore, the outage simulator module 212 may simulate a situation where the disrupted target location 306A experiences a service disruption, thereby preventing any data from flowing through the disrupted target location 306A. In such a situation, the outage simulator module 212 may help determine which other facilities 306B-306H may be affected due to the service disruption at the target location 306A. In addition, the outage simulator module 212 may be configured to simulate the flow of data traffic through alternate routes prior to an actual service disruption occurring at any target location 306A-306E. By simulating the data traffic prior to an actual service disruption, the outage simulator module 212 allows the FORSIT application 126 to determine which adaptive restoration plan may be the most efficient in the event of a service disruption.

The FORSIT application 126 may also communicate with other application programs stored on the same computer or a different computer. For instance, as described above, the FORSIT application 126 may communicate with the topology correlation application module 230. The topology correlation application module 230 may display target locations 306A-306E and other facilities 306F-306H on the map display 232. The topology correlation application module 230 may be configured to receive information from the FORSIT application 126 and generate an alert on the map display 232 indicating the location of facilities in the communication network, such as a disrupted target location 306A, other target locations 306B-306E and other facilities 306F-306H capable of being affected by a service disruption at any of the target locations 306A-306E. The topology correlation application module 230 may also provide the watch list generated by the watch list application module 220, the risk evaluation report generated by the risk report generator module 222, the adaptive restoration plans developed by the adaptive restoration tool module 224 and other relevant information on the map display 232. The topology correlation module 230 may also be configured to correlate a lot of the information accessible to the FORSIT application 126, such as the target locations 306A-306E on the watch list, the status of each target location, the existence of any collapsed rings, simplex conditions and the alternative routes, on to the map display 232.

According to embodiments, the FORSIT application 126 may prepare a service restoration plan that is aimed at restoring service more efficiently. It should be appreciated that a service disruption may affect many services, including E911 calls, emergency calls, paid subscription services such as IPTV, DSL connections amongst others. The utility company may be required or find it desirable to restore certain services faster than others. For instance, the utility company may be required to restore E911 call services first and may find it desirable to restore IPTV prior to restoring the DSL services of customers.

In various embodiments, at least one of emergency E911 calls, government and military communications and other preferred subscriber services may be rerouted away from the target location. Additionally, the FORSIT application 126 may preemptively reroute data traffic away from the target location, such that no service disruption is experienced even if a cable is cut at the target location. Since the FORSIT application 126 may preemptively reroute data traffic away from the target location, the extent of the service disruption may vary depending on various factors including the diversity available at the target location, the volume of data traffic, and the amount and type of data traffic that was preemptively rerouted.

Turning now to FIG. 3, the map 232 illustrates a map of a general area where customers have placed locate requests with the one call center for conducting an activity at a target location. The activity may be a dig request for a road widening project, installing new lines or rerouting wires for the installation of a fence. Facilities 306A-306H include target locations 306A-306E, which are those facilities where a customer has placed a request for conducting an activity. The remaining facilities 306F-306H represent utility lines sites where no customer has requested a locate with the one call center. However, it should be appreciated that when an activity is performed at a particular target location, for example 306A, there is a risk of a service disruption at all the other facilities 306B-306H. This is because hardware at the other facilities 306B-306H communicating with the disrupted target location 306A may no longer send or receive data to and from the hardware at the disrupted target location 306A.

The map display 232 may also be configured to alert a user of a service disruption at a target location. According to embodiments, the alert 304 is shown as a square around the target location 306A on the map display 232. However, it should be appreciated that the alert may be in any shape or form, such as a blinking light, a star, a sound, or a different colored symbol. There may also be various symbols for the extent of the alert, such that a user can recognize the degree of service disruption and the priority of service restoration at a particular target location based on the symbol used to indicate the alert.

It should be appreciated that the hardware associated with each of the facilities 306A-306H may be connected with at least one other hardware associated with at least one of the other facilities 306A-306H. Therefore, a service disruption caused by an activity on the hardware at a particular target location 306A may disrupt service at other facilities 306B-306H as well. Therefore, utility companies may have transport provision systems in place that delineate the data traffic routes throughout a communication network. These transport provision systems help reroute data traffic from the target location 306A to other facilities 306B-306H in the event of a service disruption.

As described above, the map display 232 may be configured to display target locations, facilities capable of being affected by service disruptions at the target locations, as well as target locations that are already disrupted. In addition, the map display 232 may also display watch lists, risk evaluation reports, adaptive restoration plans and simulation of the adaptive restoration plans generated by the outage simulator module 212. According to embodiments, the map display 232 may also be interactive, which may allow a user of the map display 232 to request information from the FORSIT application 126, or make changes to the watch list, risk evaluation report or adaptive restoration plans. According to some embodiments, the map display 232 may also display diversification route maps, which illustrate alternative data traffic routes that may be implemented in the event of a service disruption.

Figure 4:
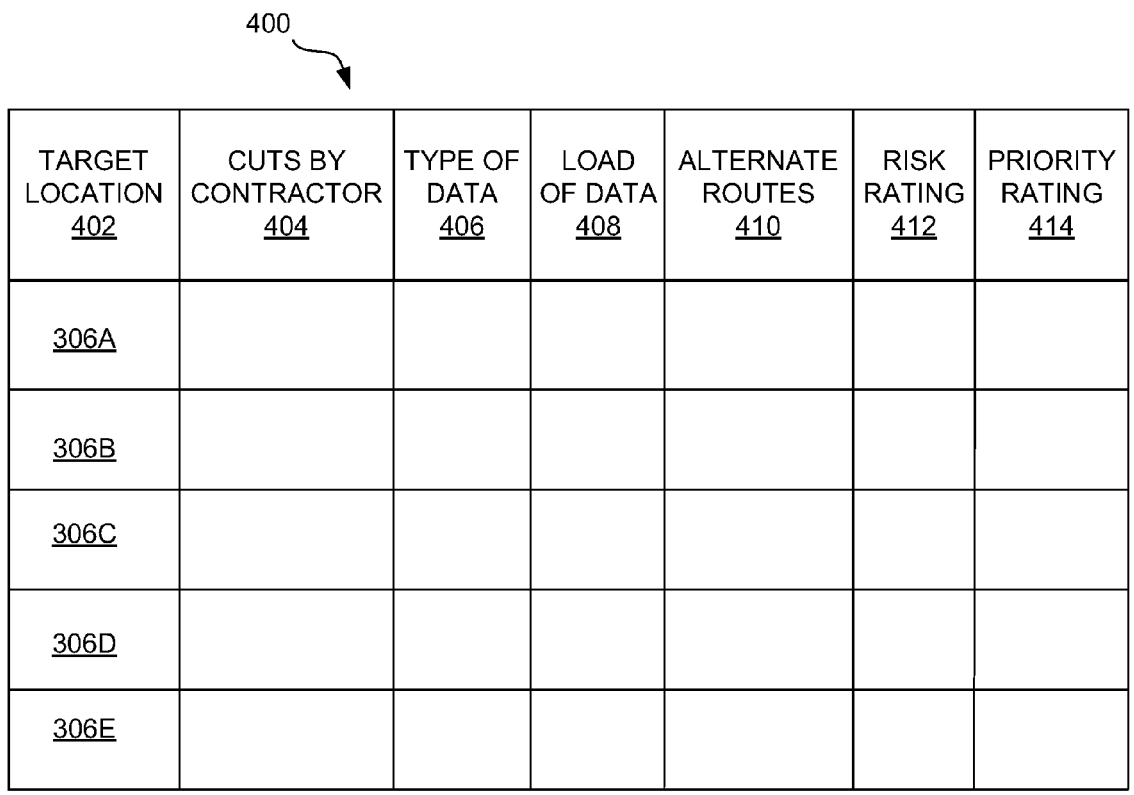
FIG. 4 illustrates an evaluation report including data relating to a dig request utilized in various embodiments.

Referring now to FIG. 4, the risk evaluation report 400 is shown. In various embodiments, the risk evaluation report 400 may include a list of target locations 306A-306E, information pertaining to the activity being performed at the target location and a risk rating to assist the utility company in proactively preparing for a service disruption. Target locations with a higher risk rating are more likely to experience some sort of a service disruption, while target locations with a lower risk rating are less likely to experience some sort of a service disruption.

The risk evaluation report 400 includes a target location field 402, a cuts by contractor field 404, a type of data field 406, a load of data field 408, an alternate routes field 410, a risk rating field 412 and a priority rating field 414. The target location field 402 indicates the target locations 306A-306E. As previously described, the target location 306A-306E includes locations where a request for conducting activity has been made. The cuts by contractor field 404 may indicate the number of cuts a particular contractor has performed. In various embodiments, this field may be a score or grade that is assigned based on the recency of the cut or the extent of the cut. The type of data field 406 indicates what type of data is passing through the hardware at each of the target locations 306A-306E. The type of data may be relevant in determining the priority rating of the particular location. For instance, if the hardware associated with the target location 306A is carrying emergency calls, or preferred utility services such as IPTV, the target location may have a higher priority rating.

The load of data field 408 indicates the volume of data traffic flowing through hardware at each of the target locations 306A-306E. The volume of data traffic may affect the priority rating of the target locations 306A-306E, since locations with high volume of data traffic having a higher priority rating then target locations with a lower volume of data traffic. The alternate routes field 410 indicates the number of alternate routes available. In various embodiments, this field may indicate a score or grade that represents the diversification of a target location. The number of alternate routes and the volume of data traffic that the alternate routes are currently experiencing compared to their maximum volume capacity may affect the diversity of a target location.

The risk evaluation report 400 may also include the risk rating field 412 that indicates the probability of a service disruption at each of the target locations 306A-306E. The risk rating field 412 may be a score or grade, which determines the probability of a service disruption by considering the contractors' historical performance at each of the target locations 306A-306E, the historical records of the target locations, the complexity of the hardware associated with each of the target locations and the type of activity being performed at the target locations by the contractor.

The risk evaluation report 400 may also include the priority rating field 414 that indicates a priority level to a particular target location. According to exemplary embodiments, the priority level is determined based on the type of data passing through the hardware; the load of data, which is the volume of data traffic; the diversity at the target location; the physical location of the target location and the number and type of subscribers that may be affected by a service disruption at the target location.

The risk evaluation report 400 may be prepared by the FORSIT application 126 and viewed by an operator, such as the utility company operator 106, who may then prepare a restoration plan according to the priority and risk ratings. According to embodiments, the risk evaluation report 400 may be utilized by the adaptive restoration tool module 224 of the FORSIT application 126 for preparing an adaptive restoration plan with or without the help of an operator.

Figure 5:
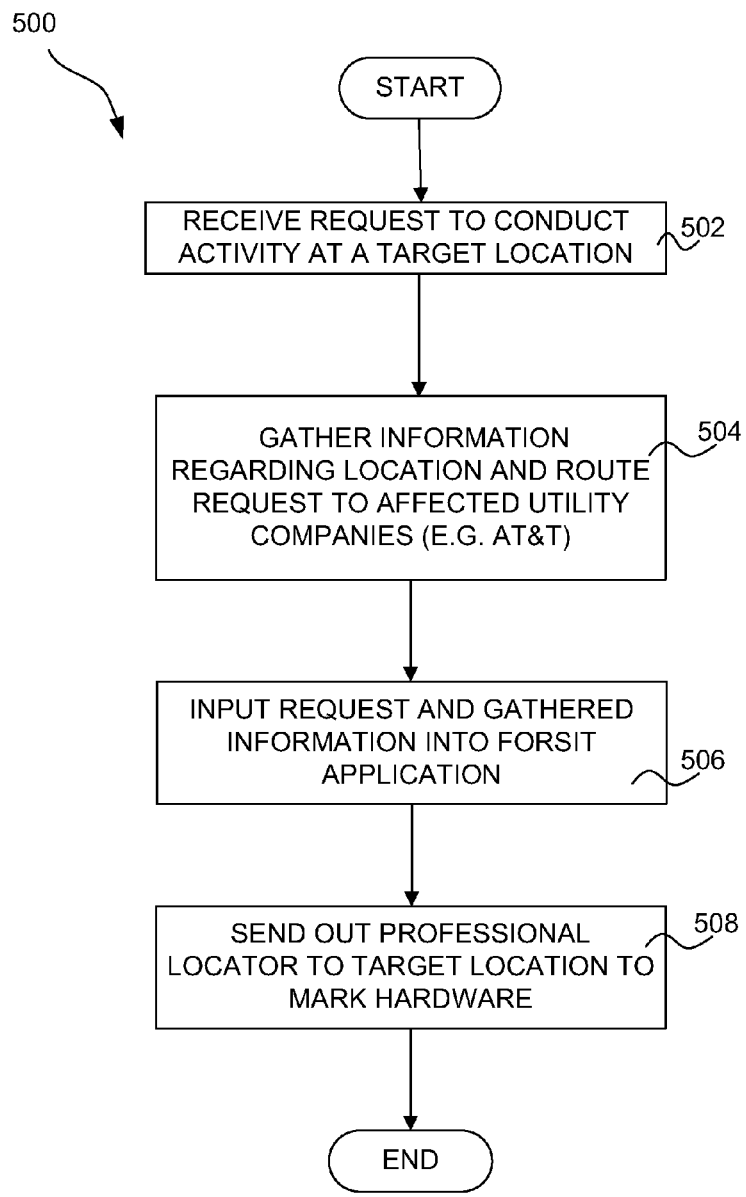
FIG. 5 is a logical flow diagram illustrating aspects of a process for placing a dig request made through a one call center according to various embodiments.

Referring now to FIG. 5, further details regarding the operation of the locate request will be described. In particular, FIG. 5 illustrates a routine 500 for requesting a locate by the affected utility companies. The routine 500 begins at operation 502 where the customer 102, such as a professional contractor or homeowner contacts the one call center with a request to conduct an activity at a target location. From operation 502, the routine 500 proceeds to operation 504, where the one call center operator 104 gathers information from the customer 102 regarding the location and the customer, and then routes the gathered information and request to the affected utility companies. The one call center operator 104 may receive information regarding the physical address of the target location, the type of activity being conducted, the purpose of the activity and information about the customer from the customer 102. From operation 504, the routine 500 proceeds to operation 506, where the utility company operator 106 receives the information from the one call center operator 104 and inputs it into the FORSIT application 126. In one embodiment, the utility company operator 106 may contact the customer 102 directly to obtain more information about the type of activity, the customer, the company performing the activity at the target location, the duration of the activity, and the time and date the activity with begin and terminate. From operation 506, the routine proceeds to operation 508, where the utility company sends out a professional locator 108 to the target location to demarcate hardware associated with the target location. From operation 508, the routine 500 ends.

Figure 6:
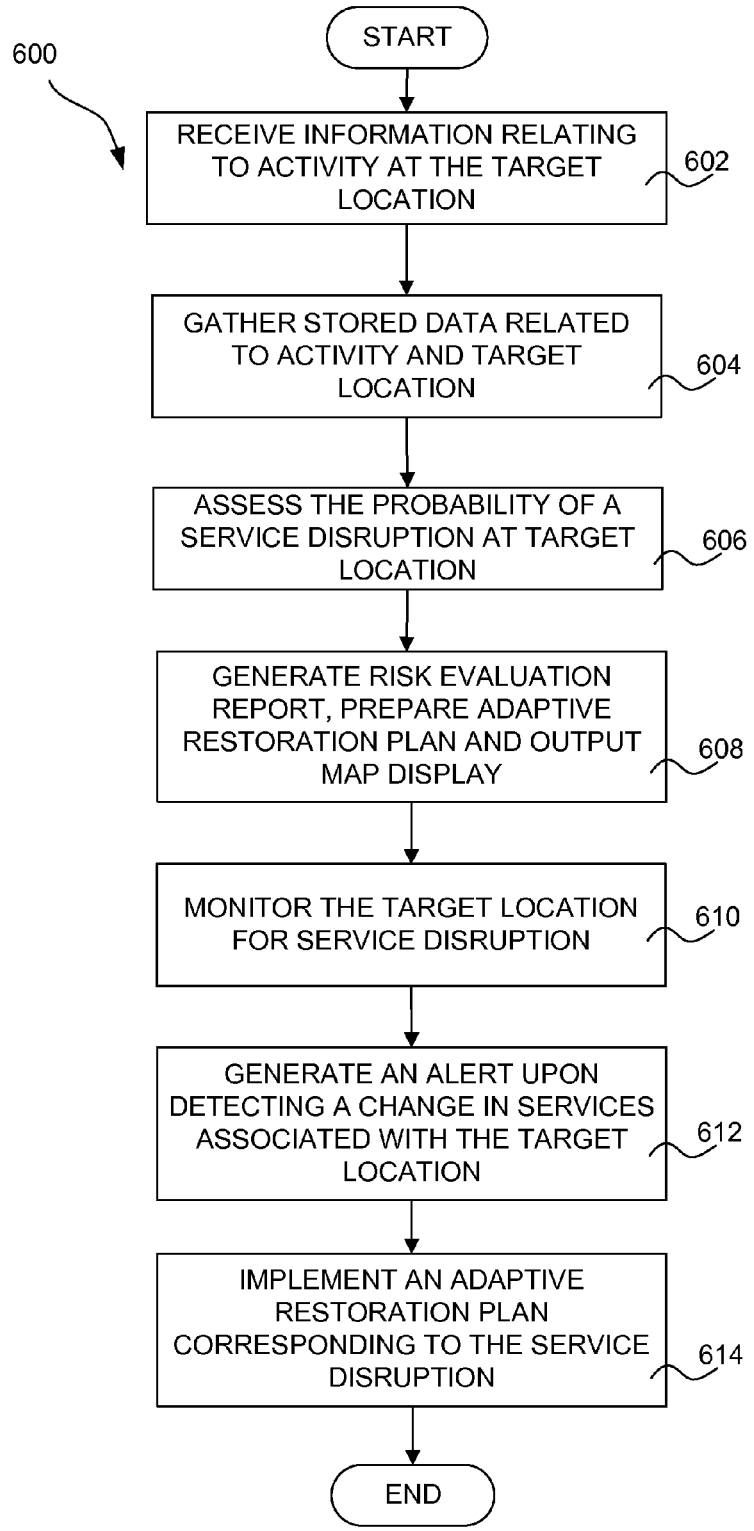
FIG. 6 is a logical flow diagram illustrating aspects of a process for preparing for a service disruption once the dig request has been placed according to various embodiments.

Turning now to FIG. 6, further details regarding the operation of the FORSIT application 126 will be described. In particular, FIG. 6 illustrates a routine 600 for proactively preparing for a service disruption. The routine 600 begins at operation 602 where the FORSIT application 126 receives information relating to an activity at a target location, such as the target location 306A. According to some embodiments, the information is supplied to the FORSIT application 126 by the utility company operator 106 who received the information from the one call center operator 104. In various embodiments, the utility company operator 106 submits the information to the FORSIT application 126 over the network 130. From operation 602, the routine 600 proceeds to operation 604, where the FORSIT application 126 gathers stored data related to the type of activity, the target location 306A and the customer performing the activity at the target location. This information may be gathered from historical records from the historical one call records database 226 and the facility and service database 228 that may be stored on the network 130.

The type of data that may be gathered includes the type of activity being performed at the target location 306A, historical information of all types of activities performed at the target location, the results of any activities performed, whether the activity caused a service disruption, and if a service disruption was caused and what arrangements, if any, the utility company made to restore service. Other information may include gathering historical information on the customer 102, such as whether the contractor performing the activity has performed any activities before, what the results were of those activities, whether any service disruptions occurred while those activities were performed, and whether the contractor completed the activity on time.

Upon gathering the stored data related to the activity and the target location 306A at operation 604, the routine proceeds to operation 606, where the FORSIT application 126 assesses the probability of a service disruption at the target location 306A caused by the activity based on the stored data relating to the activity, the target location, and the customer. The probability of a service disruption may increase if the customer has cut cables before, or if the target location 306A has had service disruptions in the past while performing an activity at the target location 306A. Other factors for affecting the probability of a service disruption may include the length of time the activity will last, the number of cables at the target location 306A, and the type of activity being performed. In various embodiments, the FORSIT application 126 may produce a risk level that denotes the likelihood of a service disruption at the target location 306A. Based on the risk level, the utility company may be prepared in advance to restore service, such that in the event that the service is disrupted, the utility company may restore service quicker than before. In some embodiments, some or all of the data traffic may be rerouted prior to performing an activity at the target location.

From operation 606, the routine 600 proceeds to operation 608, where the FORSIT application 126 generates the risk evaluation report 400. As described above, the risk evaluation report 400 may include the risk rating 412 and priority rating 414 of the target locations 306A-306E. In addition, information generated from the risk evaluation report 400 may be utilized by the adaptive restoration tool module 224 to prepare the adaptive restoration plan that may be implemented in the event of a service disruption at any of the target locations 306A-306E. In addition, the FORSIT application 126 may also generate the map display using the topology correlation application and provide the map display 232 to the utility company operator 106 or a service restoration crew. As previously discussed, the map display 232 illustrates the target locations 306A-306E, other facilities 306F-306H capable of being affected by a service disruption 306F-306H, and alerts indicating service disruptions at one of the locations 306A-306H, if any exist.

From operation 608, the routine 600 proceeds to operation 610, where the FORSIT application 126 monitors the target locations 306A-306E for service disruption. In some embodiments, the target locations 306A-306E may be monitored by an operator, such as the utility company operator 106. Monitoring the target locations may include monitoring the target locations for a service disruption or monitoring the flow of data through the target locations, such that if the volume of data traffic at the target locations falls below a threshold data traffic value, an alert should be generated.

While the target locations 306A-306E are being monitored, if service at one of the target locations 306A-306E is disrupted or if the data traffic falls below the threshold data traffic value, the routine 600 proceeds to operation 612, where the FORSIT application 126 generates an alert indicating that service at the target location 306A has been disrupted. In various embodiments, the FORSIT application 126 may generate an alert upon detecting any significant change in the services at the target location. In some embodiments, the FORSIT application or an operator monitoring the target location may generate an alert. According to embodiments, the alert may be displayed on the map display 232, such as the alert 304 around the target location 306A.

From operation 612, the routine 600 proceeds to operation 614 where the FORSIT application 126 may implement an adaptive restoration plan corresponding to the service disruption at the target location 306A in the event that a service disruption is experienced. The adaptive restoration plan may be implemented through the approval of an operator, or automatically through the FORSIT application 126. In some embodiments, a separate application program may be responsible for implementing the adaptive restoration plan.

It will be appreciated that embodiments of the present invention provide methods, systems, apparatus, and computer-readable media for proactively preparing for service disruptions. Although the embodiments have been described in language specific to computer structural features, methodological acts, and by computer readable media, it is to be understood that the embodiments defined in the appended claims are not necessarily limited to the specific structures, acts, or media described. Therefore, the specific structural features, acts, and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for preparing for a service disruption, comprising:
   receiving information relating to an activity at a target location, wherein receiving information relating to the activity at the target location comprises receiving information relating to at least a type of the activity, hardware associated with the target location, and a contractor performing the activity;
   upon receiving the information relating to at least the activity at the target location, gathering stored data related to the activity and the target location;
   assessing a probability of a service disruption at the target location based at least on the stored data related to the activity and the target location, wherein assessing the probability of the service disruption at the target location comprises analyzing at least historical information relating to the type of the activity, the target location, and the contractor performing the activity;
   monitoring the target location; and
   generating an alert upon detecting a change in services associated with the target location.

2. The method of claim 1, further comprising:
   determining other facilities capable of being affected by the activity at the target location; and
   monitoring the other facilities capable of being affected by the activity at the target location.

3. The method of claim 1, further comprising:
   determining layers of transmission data passing through the hardware associated with the target location;
   assessing a probability of a service disruption to the layers of transmission data; and
   preparing a transmission layer adaptive restoration plan for each of the layers of transmission data passing through the hardware.

4. The method of claim 1, further comprising generating an evaluation risk report indicating a risk level for a particular activity at the target location.

5. The method of claim 1, further comprising preparing an adaptive restoration plan for restoring service upon a service disruption at the target location, which comprises:
   establishing a diversification route map illustrating an alternative data route in the event of a service disruption; and
   notifying a repair crew of potential locations of service disruptions.

6. The method of claim 2, wherein determining other facilities capable of being affected by the activity at the target location, comprises:
   determining hardware at the target location capable of being affected;
   upon determining the hardware at the target location capable of being affected, determining a type of transmission data being carried through the hardware that is capable of being affected; and
   determining the other facilities capable of carrying the type of transmission data associated with the target location that is capable of being affected.

7. A computer-readable medium having computer-executable instructions stored thereon which, when executed by a computer, cause the computer to:
   receive information relating to an activity at a target location, wherein the information relating to the activity at the target location received relates to at least a type of the activity, hardware associated with the target location, and a contractor performing the activity;
   upon receiving the information relating to at least the activity at the target location, gather stored data related to the activity and the target location;
   assess a probability of a service disruption at the target location based on at least the stored data related to the activity and the target location, wherein assessing the probability of a service disruption at the target location comprises analyzing at least historical information relating to the type of the activity, the target location, and the contractor performing the activity;
   monitor the target location; and
   generate an alert upon detecting a change in services associated with the target location.

8. The computer storage medium of claim 7, having further computer-executable instructions stored thereon which, when executed by the computer, cause the computer to:
   determine layers of transmission data passing through the hardware at the target location;
   assess a probability of a service disruption to the layers of transmission data; and
   prepare a transmission layer adaptive restoration plan for each of the layers of transmission data passing through the hardware.

9. The computer storage medium of claim 7, having further computer-executable instructions stored thereon which, when executed by the computer, cause the computer to generate an evaluation risk report indicating a risk level for a particular activity at the target location.

10. The computer storage medium of claim 9, having further computer-executable instructions stored thereon which, when executed by the computer, cause the computer to prepare an adaptive restoration plan configured to restore service upon a service disruption at the target location, wherein preparing the adaptive restoration plan comprises:

establishing a diversification route map that is configured to switch the data route in the event of a service disruption; and notifying a repair crew of potential locations of service disruptions.

11. The computer storage medium of claim 7, having further computer-executable instructions stored thereon which, when executed by the computer, cause the computer to:

determine other facilities capable of being affected by the activity at the target location; and monitor the other facilities capable of being affected by the activity at the target location.

12. The computer storage medium of claim 7, wherein the information relating to the activity at the target location further comprises information indicating whether the activity at the target location is capable of disrupting the transmission of emergency calls, E911 calls, and IPTV data.

13. The computer storage medium of claim 7, having further computer-executable instructions stored thereon which, when executed by the computer, cause the computer to prepare an adaptive restoration plan configured to restore service upon a service disruption at the target location, wherein preparing the adaptive restoration plan comprises:

determining a volume of data traffic passing through the hardware associated with the target location;

determining the type of data traffic passing through the target location; and preparing alternate routes using the volume of data traffic and the type of data traffic passing through the target location.

14. A system for preparing for service disruptions, comprising a memory device for storing a program for preparing against service disruptions; and a processor, functionally coupled to the memory device, the processor being responsive to computer-executable instructions contained in the program that, when executed by the processor, cause the processor to:

receive information relating to an activity at a target location, wherein the information relating to the activity at the target location received relates to at least a type of the activity, hardware associated with the target location, and a contractor performing the activity, upon receiving the information relating to at least the activity at the target location, gather stored data related to the activity and the target location, assess a probability of a service disruption at the target location, monitor the target location, and generate an alert upon detecting a change in services associated with the target location.

15. The system of claim 14, wherein assessing the probability of the service disruption at the target location comprises analyzing at least historical information relating to the type of the activity, the target location, and the contractor performing the activity.

16. The system of claim 14, the processor being responsive to further computer-executable instructions contained in the program that, when executed by the processor, cause the processor to:

determine layers of transmission data passing through the hardware associated with the target location;

assess a probability of a service disruption to the layers of transmission data; and prepare a transmission layer adaptive restoration plan for each of the layers of transmission data passing through the target location.

17. The system of claim 14, the processor being responsive to further computer-executable instructions contained in the program that, when executed by the processor, cause the processor to:

generate an evaluation risk report indicating a risk level for a particular activity at the target location; and prepare an adaptive restoration plan configured to restore service upon a service disruption at the target location.

\* \* \* \* \*